United States Patent [19]

van Manen

[11] 4,428,899

[45] Jan. 31, 1984

[54] METHOD OF MAKING SOCKETED PIPE-FITTINGS OF SYNTHETIC PLASTICS MATERIAL BY INJECTION MOULDING, APPARATUS FOR CARRYING OUT SAID METHOD

[76] Inventor: Dirk van Manen, De Bente 10, 7751 GM Dalen, Netherlands

[21] Appl. No.: 390,045

[22] Filed: Jun. 18, 1982

[30] Foreign Application Priority Data

Jun. 22, 1981 [NL] Netherlands ................. 8103011

[51] Int. Cl.³ .................. B29C 1/14; B29C 27/00; B29D 23/02; B29F 1/00
[52] U.S. Cl. .................. 264/249; 29/235; 29/451; 264/271.1; 264/318; 264/336; 264/339; 264/342 R; 264/348; 425/324.1; 425/383; 425/397; 425/404; 425/412; 425/436 R
[58] Field of Search .......... 264/259, 271.1, 275, 264/320, 328.1, 328.2, 334, 249, 339, 336, 230, 348, 342 R; 425/110, 112, 117, 127, 129 R, 383, 392, 393, 400, 412, 414, 422, 436 R, 324.1, 394, 397, 404, 230; 29/235, 451

[56] References Cited

U.S. PATENT DOCUMENTS

| | | | |
|---|---|---|---|
| 3,081,102 | 3/1963 | Murray et al. | 29/451 |
| 3,520,047 | 7/1970 | Muhlner et al. | 264/249 |
| 3,776,682 | 12/1973 | Parmann | 425/393 |
| 3,807,027 | 4/1974 | Heisler | 29/451 |
| 3,836,622 | 9/1974 | Sporre | 264/249 |
| 3,887,674 | 6/1975 | Oostenbrink | 425/393 |
| 3,887,992 | 6/1975 | Parmann | 264/249 |
| 3,960,472 | 6/1976 | O'Connor et al. | 264/334 |
| 4,170,448 | 10/1979 | French | 425/393 |

*Primary Examiner*—Willard E. Hoag
*Attorney, Agent, or Firm*—Scully, Scott, Murphy & Presser

[57] ABSTRACT

Method and apparatus of making socketed pipe-fittings of synthetic plastics material by injection moulding. Prior to starting the injection moulding process a sealing ring is held in somewhat pinched condition with reduced outer diameter at the level of means to be formed on the socket for receiving the sealing ring. During the injection moulding process the sealing ring is held in this condition and is isolated from the moulding cavity. After sufficient, but incomplete cooling of the socket formed, the sealing ring receiving means are partially and temporarily deformed, and the sealing ring is released to enable it to spring into the partially deformed ring receiving means. Thereafter the ring receiving means reassume their original form, thereby firmly gripping the sealing ring.

13 Claims, 7 Drawing Figures

METHOD OF MAKING SOCKETED PIPE-FITTINGS OF SYNTHETIC PLASTICS MATERIAL BY INJECTION MOULDING, APPARATUS FOR CARRYING OUT SAID METHOD

This invention relates to a method of making pipe fittings of synthetic plastics material, including a socket comprising means for receiving a sealing ring. The invention also relates to apparatus for carrying out said method, and to a pipe fitting produced by the method.

Various methods of making plastics sockets for, or in, plastics pipes are known. The known methods have the disadvantage that the means for receiving and retaining a sealing ring are difficult to form. Furthermore, the known method does not permit forming the socket and installing the sealing ring at the same time. The sealing ring is placed in the ready socket afterwards, which should be done by hand.

Dutch patent application No. 79,07705 describes a method of forming a plastics socket for pipe connections, in which after forming the socket by injection moulding, a sealing ring is formed in the socket also by injection moulding. This prior method requires relatively complicated apparatus, and furthermore makes special demands on the material of the sealing ring.

It is an object of the present invention to overcome these disadvantages. To this effect, according to the invention, a method of the kind described is characterized by, prior to the injection moulding process, placing a sealing ring in slightly pinched condition with reduced outer diameter at the level of the means to be formed on the socket for receiving the sealing ring, and holding it in this position during the injection moulding process, the sealing ring being isolated from the moulding cavity during the injection moulding process; and, after sufficient, but incomplete, cooling of the moulded socket, temporarily and partially deforming the means for receiving the sealing ring, and releasing the sealing ring to permit the same to spring into the partially deformed ring receiving means, which thereafter reassume their original shape, thereby gripping the sealing ring.

An apparatus for carrying out the method is characterized, according to the invention, by a movable core comprising a recess for storing the sealing ring during the injection moulding process in slightly pinched condition; a first sleeve movable about said core, which sleeve in the injection moulding position, together with a mould section defines the moulding cavity for the socket, and seals the recess of the core with the sealing ring therein from the moulding cavity; a second sleeve movable about said first sleeve, which second sleeve together with said first sleeve, in the moulding position defines the moulding cavity for the ring receiving means.

The invention will be described in more detail hereinafter with reference to the accompanying drawings, in which FIG. 1 diagrammatically shows the method according to the present invention;

Figure 1:
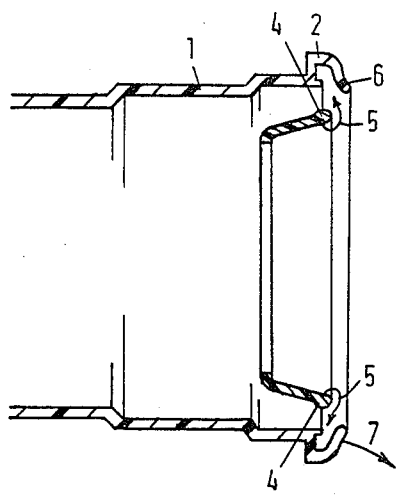

FIG. 1 illustrates diagrammatically the method according to the invention. Reference numeral 1 designates the socket end of a pipe fitting made by injection moulding. The socket comprises an integral, inwardly opening clamping edge 2, serving to receive and retain a sealing ring or sleeve. The sealing ring or sleeve is designated by 3 and is held, by holding means not shown, within the socket in such a manner that its outer diameter is smaller than would be the case in the relaxed condition of the sealing ring. This can be effected, for example, by causing a normally substantially flat ring to temporarily assume a funnel shape.

When the holding means are removed, the sealing ring reassumes its original configuration, whereby its outer rim 4 moves outwardly into the direction of the open clamping edge, and falls into the clamping edge. All this is indicated by arrows 5.

As it is generally desirable for the clamping edge to firmly hold the ring after it has assumed its final position, the clamping edge is provided with a lip-shaped rim 6, which together with the movement of the ring indicated by arrows 5 is pulled open in the direction of arrow 7, in order to provide a suitable passageway for the outer rim of the ring, whereafter it is released to grip the ring's outer rim. During these operations, the clamping edge should still be sufficiently flexible in order that, after flexing open lip 6, the original shape is reassumed as a result of the "memory" of the plastics used. In the final position, the free edge of lip 6 has a somewhat smaller inner diameter than the contiguous portion of the socket, so that the sealing ring 3 is somewhat protected.

Figure 2:
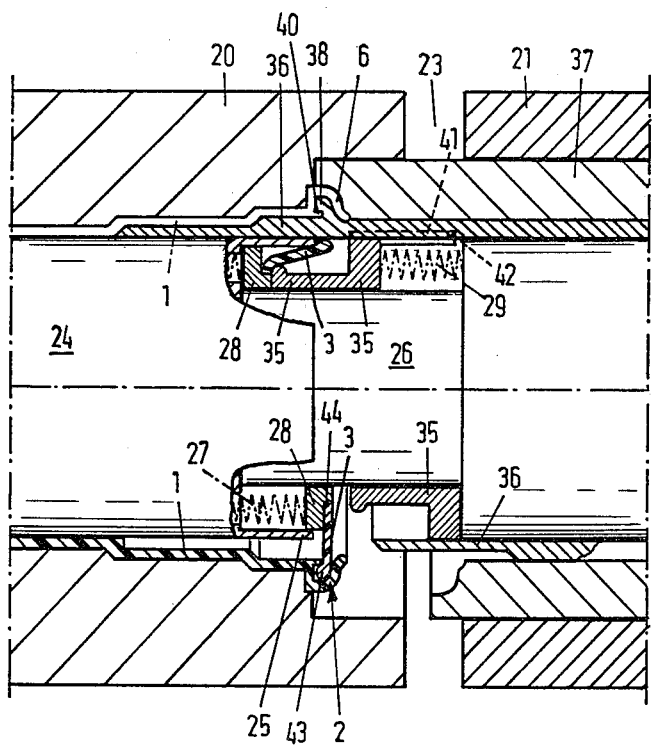
FIG. 2 is a diagrammatic cross-sectional view, showing an apparatus for carrying out the method.

FIG. 2 is a diagrammatic cross-sectional view, showing an example of an apparatus for carrying out the method according to the invention. The top part of FIG. 2 shows the situation in which sealing ring 3 is still held in its deformed condition. The bottom part of FIG. 2 shows the situation in which sealing ring 3 has been released, and its outer rim is situated within the clamping edge.

Figure 3:
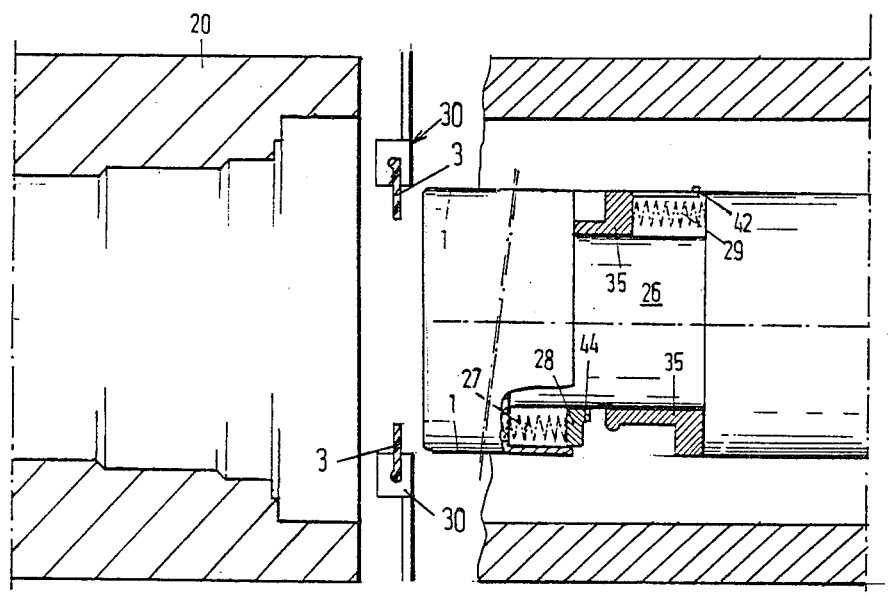
FIG. 3 illustrates an intermediate phase of the method according to the invention.

FIG. 2 shows a moulding block made up of two sections 20 and 21 for injection moulding socket 1. Provided in the moulding block are a plurality of movable parts, which will be described in more detail hereinafter. Between sections 20 and 21 of the moulding block is a gap 23, which makes it possible for the sealing ring to be brought to its initial position when the movable parts are in a suitable position. At that moment the movable parts are all situated to the right of gap 23 (see FIG. 3). The sealing ring is introduced into the gap in its proper position, and held by holding means 30, shown diagrammatically. Subsequently, a core 24 is moved to the left through the sealing ring. During this movement the inner edge of the sealing ring is stretched somewhat to allow the passage of the core. The core is provided with a shoulder, and is moved through the sealing ring to such an extent that the sealing ring falls behind the shoulder. The core is then held stationary or is delayed for a moment, and the holding means 30 release the sealing ring. The ring is now situated behind shoulder 25 around a narrowed part 26 of the core.

The shoulder of the core is undercut, and a ring 28, spring-urged by springs 27 is mounted in the undercut of the shoulder. In the quiescent condition, ring 28 has its face remote from the spring situated at the level of the shoulder, so that the sealing ring also comes to lie with one face in contact with ring 28.

Mounted in opposition to ring 28 is an L-section ring 35, which is under the force of springs 29, heavier than that of springs 27, which ring 35 when core 24 is moved further to the left is released and comes to lie with its leg 35 proximal to ring 28 in contact with the ring, and retains the latter in the undercut of shoulder 25 against the pressure caused by spring 27. This situation is show in the top part of FIG. 2.

Subsequently, a sleeve 36, which has an inner diameter equal to the outer diameter of core 24, is moved to the left, and so is a sleeve 37 placed around sleeve 36. The moulding block section 20 and sleeves 36 and 37 together enclose the moulding space for the socket to be made.

The sealing ring is completely isolated from the moulding space by sleeve 36, because in the moulding position the latter extends beyond the shoulder around core 24. Accordingly, the heat dissipated during the injection moulding process cannot adversely affect the sealing ring. If desired the core can be additionally cooled by providing suitable passages for a cooling fluid.

For the formation of the clamping edge 2 of the socket, sleeve 36 cooperates with sleeve 37, and the remainder of the socket is formed between moulding block section 20 and sleeve 36.

For this purpose sleeve 36 is provided with a collar 38, and the end of sleeve 37 proximal to collar 38 has a corresponding recess. Collar 38 is undercut to form an edge 40 on the socket being formed, which extends towards lip 6, and ensures that the sealing ring is firmly held between lip 6 and edge 40.

With the parts of the mould in the position shown in the top part of FIG. 2, the socket can be cast. As stated before, during this process the sealing ring cannot come into contact with the injection moulding composition.

After sufficient, but incomplete cooling, first sleeve 37 is moved to the right, and subsequently sleeve 36 is also moved to the right. This is possible because the socket is not yet completely cooled, so that the lip 6 of the clamping edge can be flexed outwardly to a sufficient extent to allow the passage of collar 38. During further movement of sleeve 36 to the right, the sleeve carries along ring 35 by means of a pawl 42 connected to ring 35 and extending into a recess 41 in sleeve 36. As a result, the sealing ring is urged to the right under the influence of spring 27, and the outer rim of the sealing ring is driven radially outwardly as soon as sleeve 36 has sufficiently moved to the right. At that moment the clamping edge is still sufficiently flexed outwardly for it to receive the sealing ring. As a result of the "memory" of the injection moulding material, the clamping edge reassumes its old position after a short time, so that the sealing ring is gripped in the manner shown in the bottom part of FIG. 2.

After sufficient further cooling, core 24 can also be pulled back to the right through the sealing ring, now held by the clamping edge, without the sealing ring being detached, and the product formed can be removed.

Preferably the sealing ring has a thickening 43 along its circumferential wall, which as it were catches behind the edge 40 of the socket.

As the collar 38 of sleeve 36 is undercut for it to be able to form the edge 40 on the socket, this collar is relatively vulnerable. Preferably, therefore, the undercut is locally interrupted to form slots in edge 40. This, however, is not objectionable for the sealing ring.

In order to promote that during the application of the sealing ring in the undercut of the shoulder of core 24 the sealing ring assumes a correct radial position, ring 28 may be provided with a recess 44 for receiving the sealing ring. In the axial direction this recess is somewhat less deep than the thickness of the sealing ring.

In the method and apparatus described hereinbefore, use is made of the property that synthetic plastics materials used for pipes and fittings have a "memory". Although a product of satisfactory quality is produced by the method described, and the sealing ring is firmly retained by lip 6, sometimes higher requirements are made with regard to the clamped fixation of the sealing ring.

According to the invention, these higher requirements can be satisfied by pushing lip 6, after it has been flexed outwardly to allow the passage of collar 38 of sleeve 36, and after the edge of the sealing ring has sprung into the clamping edge, actively into contact with the sealing ring. In principle, this can be effected by means of a mechanical pusher. Preferably, however, use is made of a pressure fluid, such as compressed air. This is shown diagrammatically in FIG. 4, which is largely similar to FIG. 2, and in which corresponding parts are designated by the same reference numerals.

Figure 4:
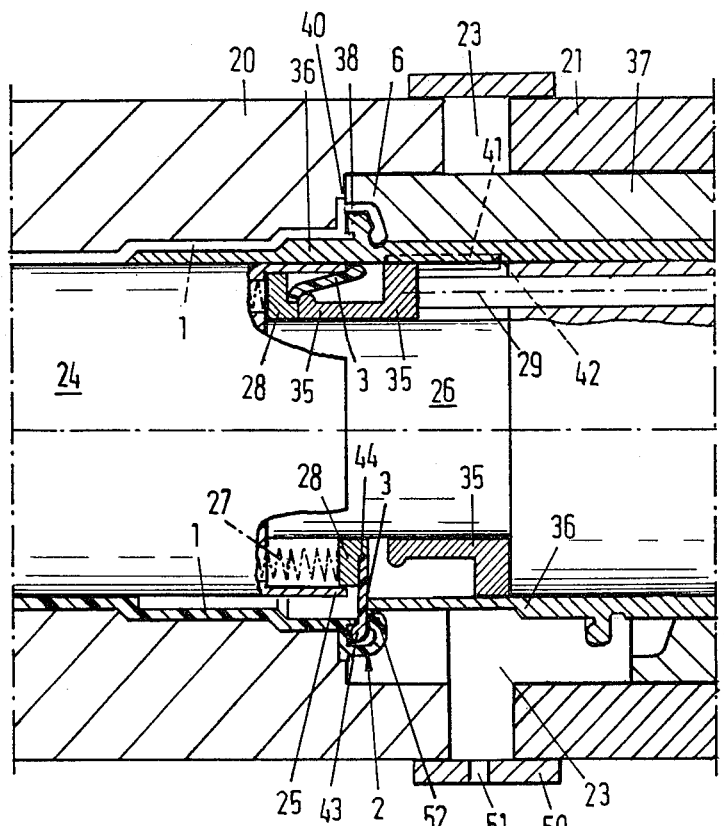
FIGS. 4 and 5 illustrate a variant of the method and apparatus according to the invention.

The apparatus of FIG. 4 differs from that shown in FIG. 2 in that sleeve 36 and ring 35 are independently operable in a manner that is known per se and therefore not illustrated in any detail.

By virtue of this arrangement, sleeve 36, after being moved into the position shown in the bottom half of FIG. 2, can be moved back to the left again a short distance without carrying along ring 35. As indicated in the bottom half of FIG. 4, sleeve 36 is moved to the left until sleeve 36 abuts sealing ring 3.

Subsequently a pressure fluid, e.g. compressed air, is supplied to chamber 23. For this purpose chamber 23 is provided with a seal 50 to form a compression chamber, which is provided with one or more supply apertures 51 for a pressure fluid. The pressure fluid pushes the free edge of lip 6 snugly into contact with sealing ring 3, whereby the free edge of lip 6 slides on sleeve 36.

Figure 5:
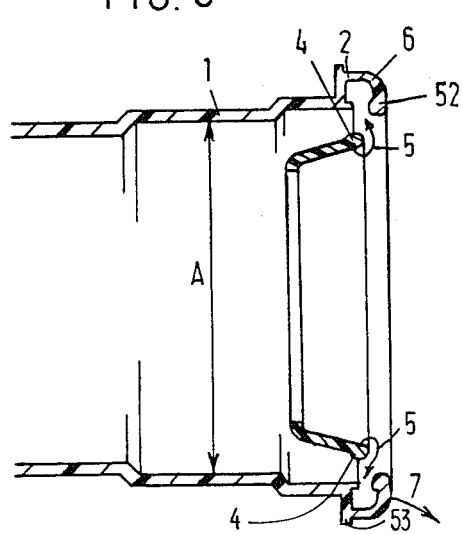

In order to promote this movement, and also to increase the clamping effect of lip 6 on sealing ring 3, the free edge of lip 6 is preferably thickened and rounded, as shown at 52 in FIG. 5.

As, in the phase when lip 6 is pressed down, the end of sleeve 36 bears on sealing ring 3, it is ensured that lip 6 forms a fully round opening, and that the ultimate inner diameter of edge 52 of lip 6 is exactly equal to the inner diameter of the farther portion 1 of the socket, as a consequence of which the seal is protected as a pipe end is moved into the socket, and a proper fit is ensured.

Figure 6:
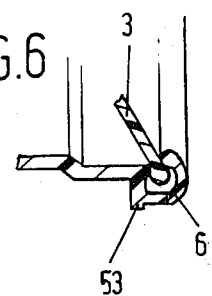
FIG. 6 shows a detail of a pipe fitting according to the invention.

All this is shown once again in FIGS. 5 and 6 (dimension A).

Furthermore, FIG. 6 shows that sealing ring 3, after being clamped by lip 6 in the manner described, assumes a position in which it extends slightly conically inwardly, and that the edge of lip 6 is depressed somewhat in the direction of part 1 of the socket. The result of these two effects is that a tube length can easily be moved into the socket.

Preferably the clamping edge 2 is additionally provided on the outside with one or more annular grooves or projections, formed by virtue of the provision of corresponding annular ridges or recesses in mould section 20, and which ensure that the presssure fluid is confined to the space within chamber 23.

In FIGS. 5 and 6, a projecting rim 53 is shown by way of illustration.

Figure 7:
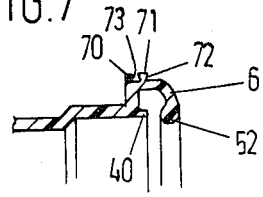
FIG. 7 shows an alternative embodiment of the pipe fitting shown in FIG. 6.

FIG. 7 shows an embodiment in which the clamping edge is provided on the outside with two annular rims 70, 71. The mould section should then be provided with corresponding grooves. The rims are slightly undercut on at least one side, as shown at 73 in FIG. 7. The result is that owing to the contraction which takes place after the injection moulding step, the rims tightly engage the grooves of the mould section to provide an excellent seal of the compression chamber. As stated before, it is also possible to use grooves, rather than rims, which grooves are likewise somewhat undercut. The mould section 20 should then be provided with corresponding rims.

For making the embodiment shown in FIG. 7, the separation between mould section 20 and sleeve 37 should be somewhat more to the right than indicated in FIGS. 2 and 4. This, however, can be realized in a simple manner.

The feature of the rim(s) or groove(s) being somewhat undercut does not present any problems as regards the release of the mould section, because the undercut is of a minor nature only, and because the mould section can be removed when the synthetic plastics material is not yet fully set.

It is noted that various modifications of the embodiments of the invention as described herein will readily occur to those skilled in the art without departing from the scope of the invention as defined in and by the following claims.

I claim:

1. A method of making a pipe fitting of synthetic plastics material by injecting moulding, said pipe fitting comprising a socket including means for receiving a sealing ring, characterized by, prior to the injection moulding process, placing a sealing ring in slightly pinched condition with reduced outer diameter at the level of the means to be formed on the socket for receiving the sealing ring, and holding it in this position during the injecting moulding process, the sealing ring being isolated from the moulding cavity during the injection moulding process; and after sufficient, but incomplete cooling of the moulded socket, temporarily and partially deforming the means for receiving the sealing ring, and releasing the sealing ring to permit the same to spring into the partially deformed ring receiving means, which thereafter reassume their original shape, thereby gripping the sealing ring.

2. A method according to claim 1, characterized by using a substantially flat sealing ring having a thickening at its circumferential edge, which thickening is capable of catching behind an edge of the ring receiving means.

3. A method according to claim 1, characterized by supplying a pressure fluid to a closed chamber having a wall partially constituted by the deformed part of the ring receiving means to thereby promote that said deformed ring receiving means reassume the original shape.

4. A method according to claim 3, characterized in that the pressure of the pressure fluid is selected so that the deformed part of the ring receiving means is somewhat overset axially in the direction of the sealing ring relative to its original shape.

5. In apparatus for injection molding a bell and spigot pipe joint, the improvement comprising: a movable core having a recess for storing a sealing ring during the injection moulding process in slightly pinched condition; a first sleeve movable about said core, which sleeve in the injection moulding position, together with a mould section, defines the moulding cavity for the socket, and seals the recess of the core with the sealing ring therein from the injection moulding cavity; a second sleeve movable about said first sleeve, which second sleeve together with said first sleeve, in the moulding position, defines the moulding cavity for the sealing ring receiving means.

6. Apparatus according to claim 5, characterized in that said first sleeve comprises a collar, around which, in cooperation with said second sleeve, a clamping lip, forming a part of the ring receiving means, can be cast on the end of the socket being formed, which clamping lip is flexed outwardly as said first sleeve is pulled back, and thereafter reassumes its original position, thereby gripping the sealing ring.

7. Apparatus according to claim 6, characterized in that the collar of the first sleeve is at least partially undercut at the side remote from the clamping lip for forming an edge on the socket directed to said clamping lip.

8. Apparatus according to claim 6, characterized by means for repositioning said first sleeve, after it has been pulled back, into a position in which said first sleeve abuts against the sealing ring to form together with the clamping lip a part of the wall of a closed annular compression chamber; and means being provided for supplying a pressure fluid to said compression chamber to press said clamping lip firmly into contact with said sealing ring.

9. Apparatus according to claim 8, characterized in that said mould section is provided adjacent the end facing the second sleeve with at least one annular recess or projecting rim in order to form at least one annular rim or groove on the outside of the ring receiving means.

10. Apparatus according to claim 9, characterized in that said at least one recess or rim is undercut on at least one upright side.

11. Apparatus according to claim 5, characterized in that the recess in the core is bounded on one side by an undercut shoulder, with an axially movable, spring-urged first ring being provided in the undercut, and a second, axially movable ring being provided in the recess in opposition to said first ring, the sealing ring being clamped between said first and said second ring during the injection moulding process and being driven in conical shape substantially under said shoulder.

12. Apparatus according to claim 11, characterized in that said second ring is coupled with said first sleeve by means of a pawl.

13. Apparatus according to claim 11, characterized in that said first ring comprises a recess for receiving the sealing ring.

* * * * *